No. 12,689.

REISSUED AUG. 27, 1907.

E. S. WOODS.

SIDE BEARING FOR CARS.

APPLICATION FILED JULY 31, 1907.

Witnesses:
G. M. Stocker
P. O. Lanterman

Inventor.
Edwin S. Woods
By Bond Adams Pickard & Jackson
Attorneys.

UNITED STATES PATENT OFFICE.

EDWIN S. WOODS, OF CHICAGO, ILLINOIS.

SIDE BEARING FOR CARS.

No. 12,689. Specification of Reissued Letters Patent. Reissued Aug. 27, 1907.

Original No. 860,177, dated July 16, 1907, Serial No. 190,823. Application for reissue filed July 31, 1907. Serial No. 386,491.

*To all whom it may concern:*

Be it known that I, EDWIN S. WOODS, a citizen of the United States of America, residing at Chicago, in the county of Cook and State of Illinois, have invented certain new and useful Improvements in Side Bearings for Cars, of which the following is a specification.

My invention relates to certain new and useful improvements in side bearings for cars, and its object is to produce a device of this class which shall have certain advantages which will appear more fully and at large in the course of this specification.

To this end, my invention consists in certain novel features of construction which are clearly illustrated in the accompanying drawings and described in this specification.

Figure 2:
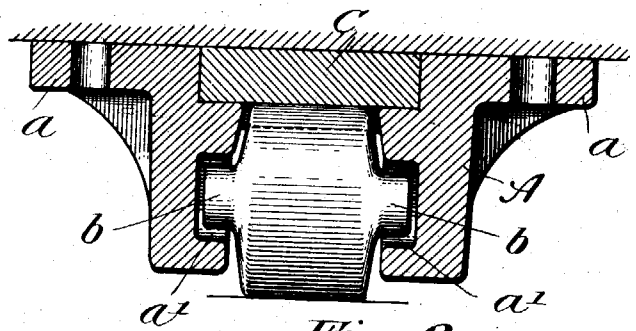
Figure 4:
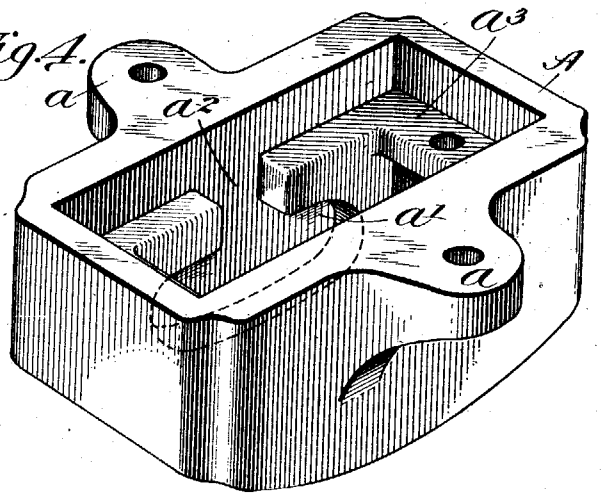
Figure 1:
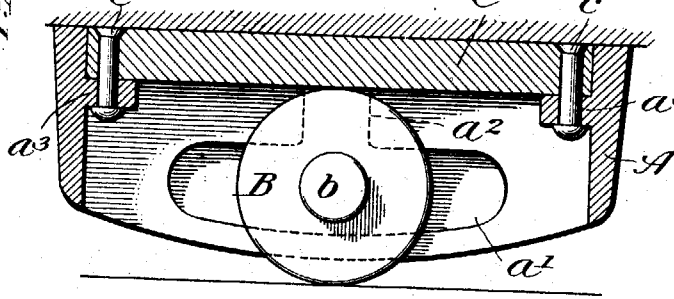
Figure 3:
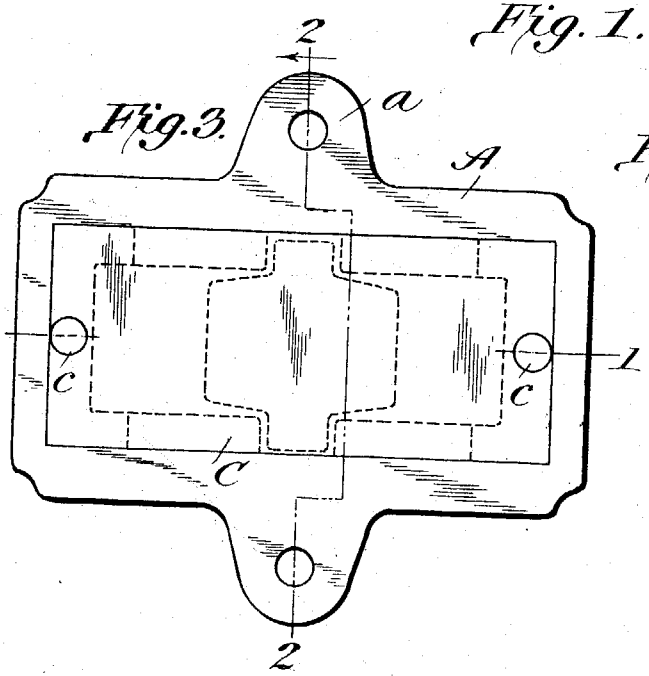

In the aforesaid drawings, Figure 1 is a central longitudinal section through one of my improved side bearings, the line of section being indicated at 1—1 of Fig. 3; Fig. 2 is a transverse section in the line 2—2 of Fig. 3, looking in the direction of the arrow; Fig. 3 is a plan view; and Fig. 4 is a perspective view of the main portion of the side bearing box.

Referring to the drawings, A is the main portion of the side bearing box, and its preferred form will be readily understood from the illustrations thereof. It will be seen that this box is rectangular in shape, open at top and bottom, and may be provided with laterally extending perforated ears, $a$, as shown in the drawing, by which it can be secured to the body supporting member of the car. The lower portion of the box is preferably curved. The sides of the box are channeled out at $a^1$, these channels running longitudinally of the box, and having upward extensions at the center. The channels, $a^1$, it will be seen, slope down slightly toward their centers, the purpose of which will be presently apparent.

B indicates a suitable roller, which has laterally extending gudgeons, $b$. In assembling this side bearing, the roller, B, is passed into the box, through the upper end, the laterally extending gudgeons of the roller, B, passing down through the upwardly extending portions of the channels at $a^2$, and resting in the horizontal portions, $a^1$, which are to guide the movement of the roller at certain times. The upward end of the box, it will be noticed, is countersunk, to receive a cover, C, which may be secured in place by rivets, $c$, which pass through flanges, $a^3$, formed upon the end walls of the box as illustrated.

The operation of this device will be readily apparent. The bearing is secured in place on the body bolster or body side bearing bridge, as are bearings of the same general construction, and when any weight is placed upon the bearing, the roller contacts with the cover, C, and rolls back and forth thereon. When, for any reason, the side bearing is raised, and the roller happens to be off the center of the bearing box, it rolls down to the center of the channel, $a^1$, that is, to the lower portion of the same.

I realize that considerable variation is possible in the details of this construction without departing from the spirit of the invention, and I therefore do not intend to limit myself to the specific form herein shown and described.

I claim as new, and desire to secure by Letters Patent:—

1. A side bearing for railway cars comprising a casing or shell which has openings in its top and bottom and a roller in said shell adapted for rolling contact, through said openings, with bearing surfaces; said casing or shell being provided with tracks located in position to support the roller when the latter is below and free from the upper bearing surface and the said roller having free movement in the shell both endwise of the latter and vertically with respect to said tracks.

2. A side bearing for railway cars comprising a casing or shell which has openings in its top and bottom and a roller in said shell adapted for rolling contact, through said openings, with bearing surfaces and provided with trunnions at its ends; said casing or shell having inwardly extending flanges forming tracks which are located in position to engage the said trunnions when the roller is below and free from the upper bearing surface and the said roller having free movement in the shell both endwise of the latter and vertically with respect to the said tracks.

3. A side bearing for railway cars comprising an upper bearing plate, an open-topped casing or shell made separate from said bearing plate, and a roller in said shell provided with trunnions at its ends; said shell having on its side walls tracks adapted to engage the trunnions when the roller is out of contact with the bearing plate and said shell and bearing plate having interfitting parts at their meeting margins, adapted to rigidly hold the bearing plate and shell from relative lateral movement.

4. In a device of the class described, the combination with a suitable roller having oppositely extending gudgeons, of a box open at its top to receive the roller, and having a longitudinally slotted bottom, through which the roller projects, there being inwardly extending side flanges on the box, to limit the downward movement of the roller, and a cover for the box, separately formed and adapted to furnish an upper tread for the roller.

5. In a device of the class described, the combination with a suitable roller having oppositely extending gudgeons, of a box open at its top to receive the roller, and having a longitudinally slotted bottom, through which the roller extends, there being horizontal channels in the side walls, and upwardly extending channels communicating therewith, through which the gudgeons pass in assembling the structure, and a cover for the box, separately formed and adapted to furnish an upper tread for the roller.

6. In a side-bearing, the combination with a casing open at the top and having a longitudinally-slotted bottom and inwardly-extending side flanges, of an anti-friction device adapted to be inserted into said casing through the open top and project through the slotted bottom thereof, and provided with oppositely-extending gudgeons adapted to engage said side flanges, and a separately formed plate adapted to be secured to said casing to form an upper tread for said anti-friction device.

7. In a device of the class described, the combination with an anti-friction device having oppositely-extending gudgeons, of a box open at the top to receive said anti-friction device and having a longitudinally-slotted bottom through which said anti-friction device projects, inwardly-extending side flanges on said box to limit the downward movement of said anti-friction device, and a cover for said box separately formed and adapted to furnish an upper tread for said anti-friction device.

EDWIN S. WOODS.

Witnesses:
JOHN L. JACKSON,
WILLIAM H. DE BUSK.